United States Patent Office 3,381,603
Patented May 7, 1968

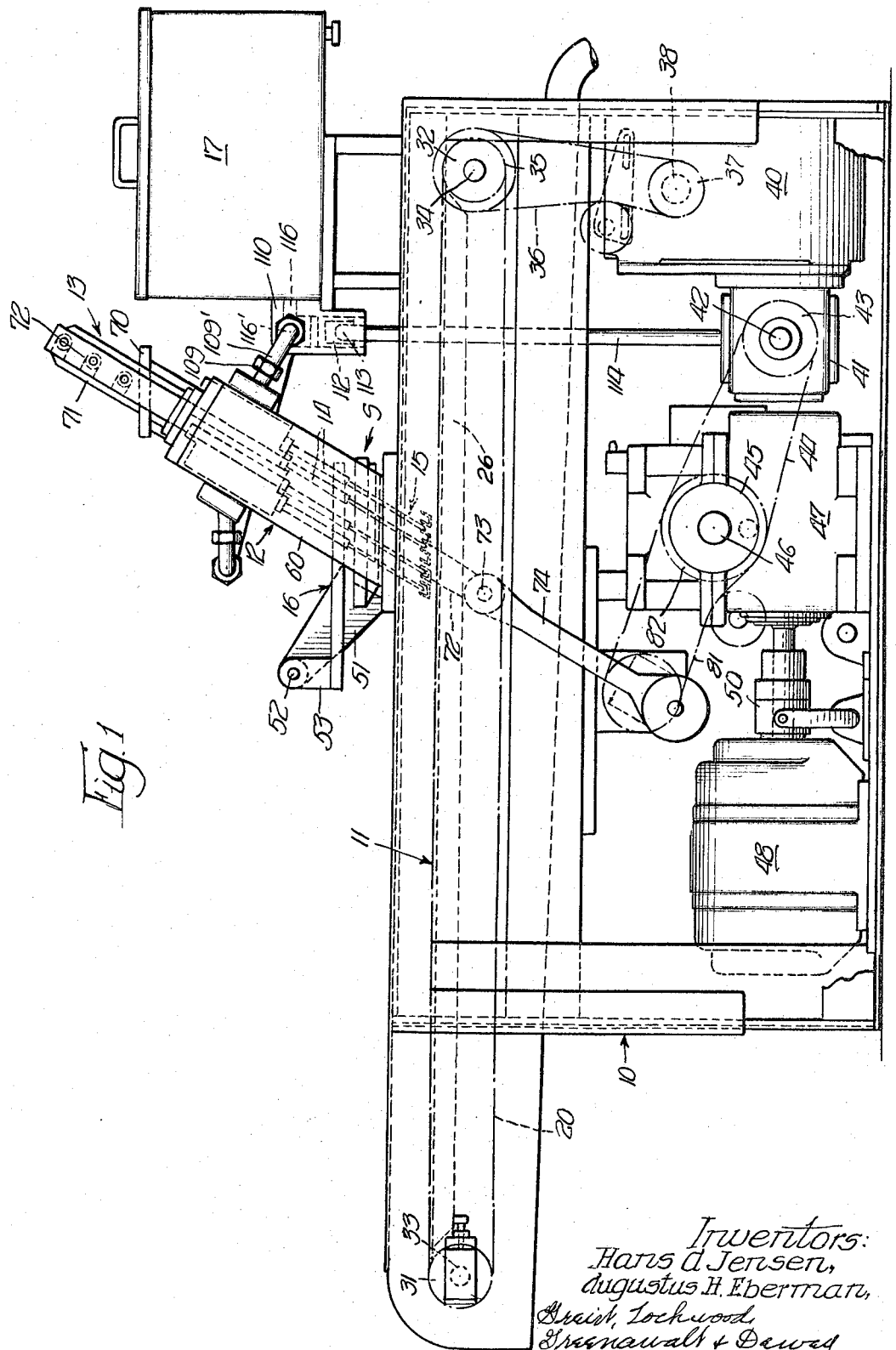

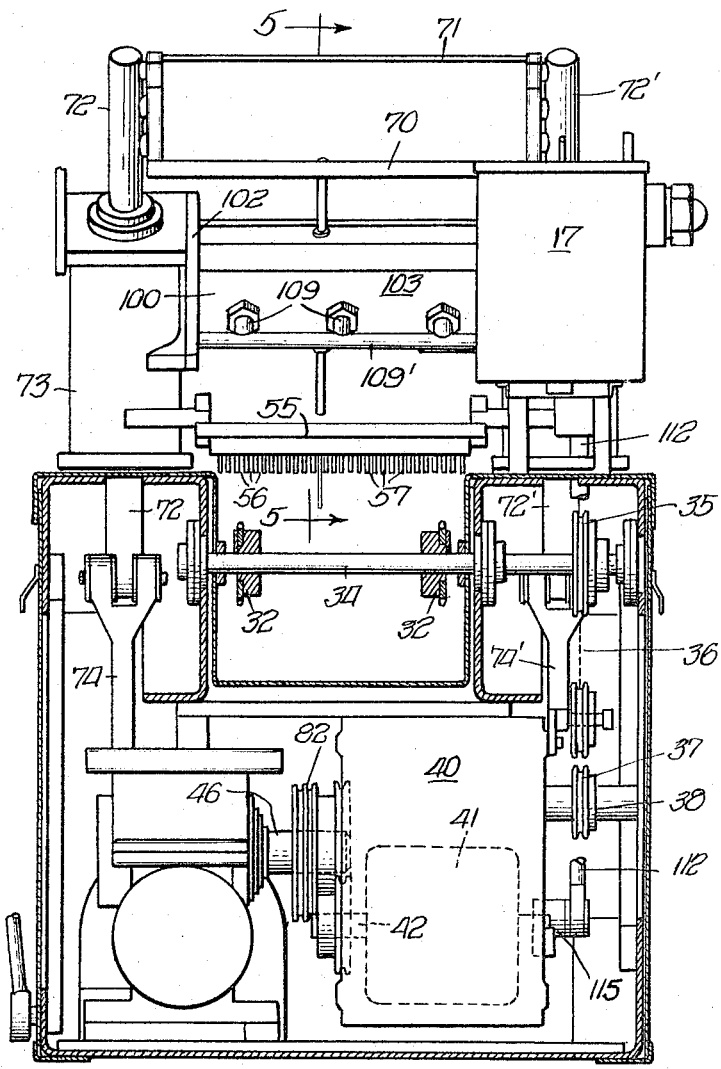

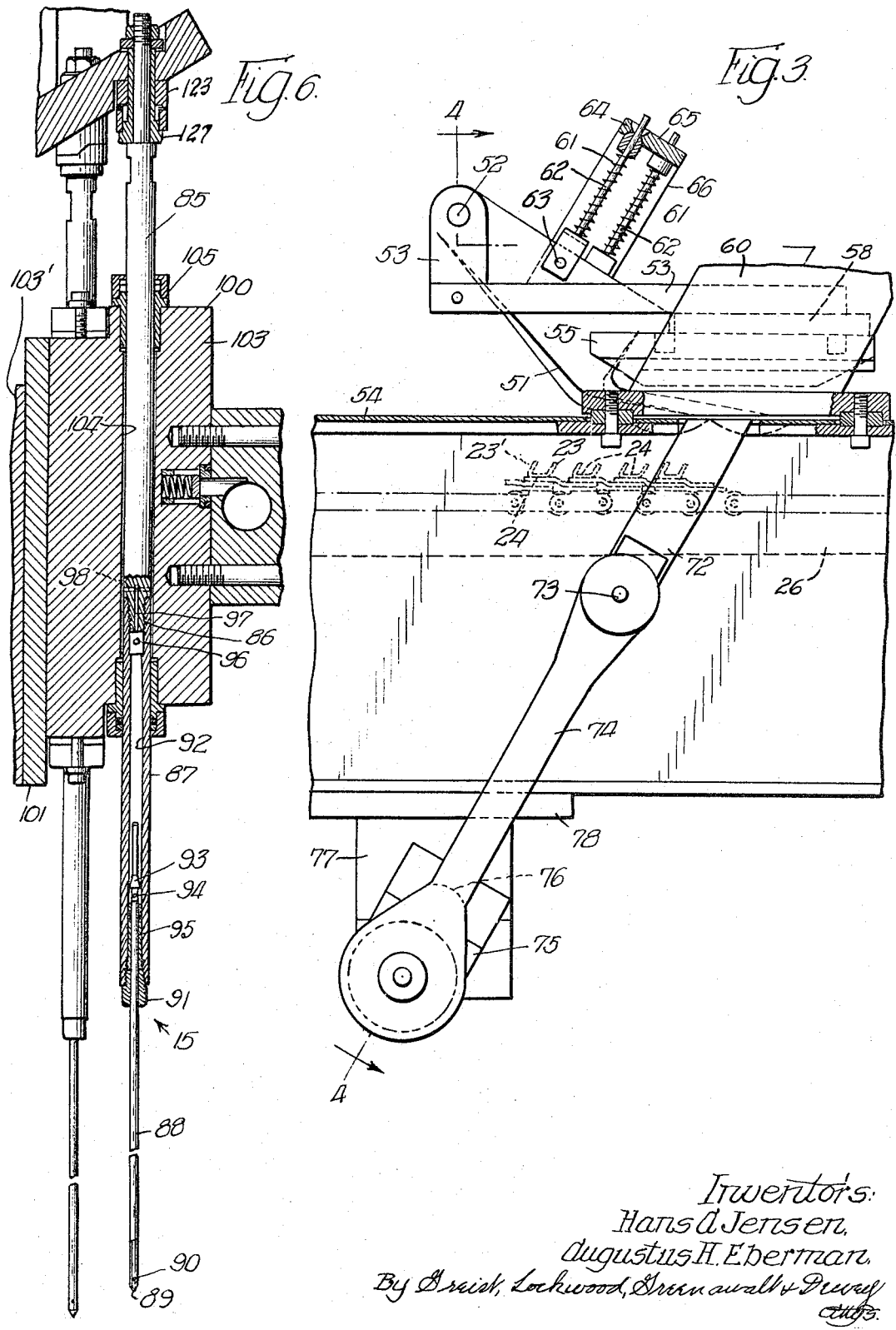

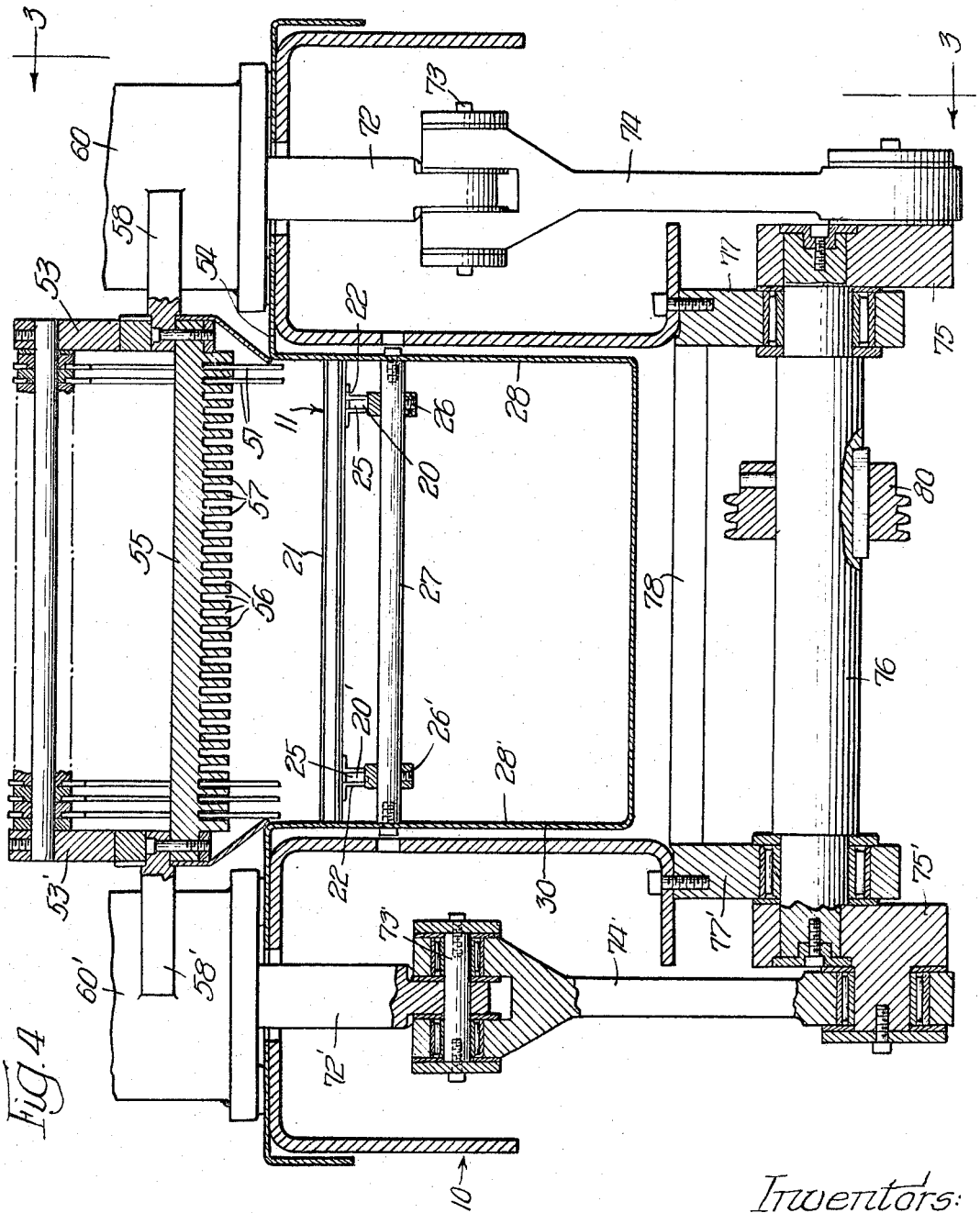

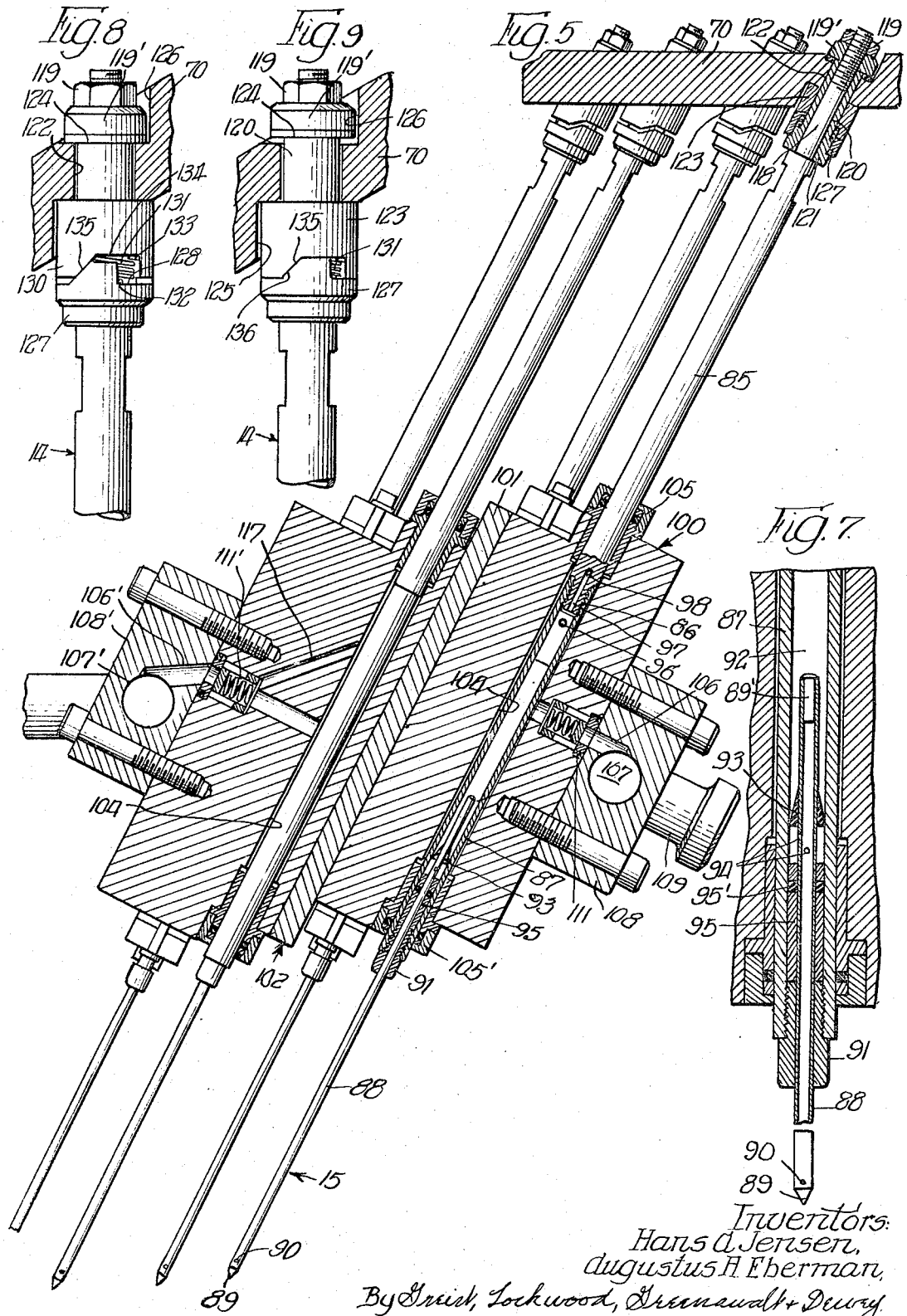

3,381,603
MACHINE FOR INJECTING CURING LIQUID INTO MEAT PRODUCTS
Hans A. Jensen and Augustus H. Eberman, Madison, Wis., assignors to Oscar Mayer & Co., Inc., Chicago, Ill., a corporation of Illinois
Filed Jan. 26, 1966, Ser. No. 523,061
12 Claims. (Cl. 99—257)

ABSTRACT OF THE DISCLOSURE

A machine for injecting curing liquid into bacon slabs or like products which comprises a conveyor on which the slabs are advanced to an injecting station where a plurality of injection needles are mounted on an overhead support frame which is reciprocated to force the needles into the slabs with the latter held on the conveyor by spring pressed pivotally mounted plates. The needles are mounted in bores in a manifold to which brine is supplied and each needle has telescoping sections and operates as a pump to force the brine into the slabs in uniform amounts according to the normal advance of the needles, with the pointed section of each being adapted to retract so as to avoid breaking if it meets with any hard material which may have been left in the slab and which obstructs the travel of the needle.

---

The present invention relates to apparatus for injecting fluids into readily penetratable bodies and is more particularly concerned with improvements in an apparatus for injecting pickling brine or similar liquids into meats or the like in connection with the curing of the same.

Machines have heretofore been developed for injecting fluids, specifically pickling brine, into meat products such as pork bellies which, when cured, form bacon slabs. The prior apparatus has included a traveling conveyor for supporting the product and reciprocably mounted hollow needles through which the brine is delivered under pressure and injected into the meat while the needles are forced into the same. The prior apparatus has not been entirely satisfactory in operation for various reasons, principally because such apparatus has not been capable of uniformly distributing the brine throughout the meat which varies in density due to the presence of varying amounts of fatty tissue. It is a principal object, therefore, of the present invention to provide an apparatus for injecting pickling brine, or similar fluid, into bacon bellies or like products so that the amount of the fluid injected into the product is uniform and not substantially affected by variations in density throughout the product.

It is a more specific object of the invention to provide a fluid injecting apparatus for meat, or the like, which is capable of more rapid and more efficient operation than heretofore obtained with similar apparatus and which results in the product receiving the fluid in uniform amounts and the discharge of the fluid into the product is the same in all portions of the product regardless of variations in density.

It is another object of the invention to provide a fluid injecting apparatus particularly designed for uniform dispersion of a pickling fluid in meat products wherein the injection is accomplished through needle assemblies having hollow, fluid receiving bodies and operated after the fashion of pumps for delivering the fluid through the product piercing ends of the needles in uniform amounts according to the movement of the needles so that the same amount of the fluid is injected into each portion of the product regardless of the difference in the density thereof.

Another object of the invention is to provide a fluid injecting apparatus comprising a reciprocating needle assembly support and needle assemblies including hollow fluid receiving bodies and product piercing end portions operative to provide for injection of a uniform amount of the fluid as the needles advance into the product and the needles being constructed and arranged so that they are self-cleaning and non-clogging.

These and other objects and advantages of the invention will be apparent from a consideration of the apparatus and the method of operating the same which is shown by way of illustration in the accompanying drawings wherein:

FIGURE 1 is a side elevation, with portions omitted, of a brine injecting machine which embodies the principal features of the invention;

FIGURE 2 is an end elevation of the machine with portions broken away;

FIGURE 3 is a fragmentary, side elevation, with portions broken away or omitted, and showing part of the head reciprocating mechanism and product hold-down devices;

FIGURE 4 is a partial cross section taken on the line 4—4 of FIGURE 3;

FIGURE 5 is a section taken on the line 5—5 of FIGURE 2, to an enlarged scale;

FIGURE 6 is a fragmentary section, similar to FIGURE 5, with the needles in a different position;

FIGURE 7 is a fragmentary sectional view, to an enlarged scale, showing a lower portion of the needle assembly;

FIGURE 8 is a fragmentary sectional view, to an enlarged scale, showing the uppermost portion of a needle assembly and associated mechanism; and FIGURE 9 is a fragmentary sectional view similar to FIGURE 8 showing the needle assembly in a different position.

The apparatus which is illustrated in the drawings and which embodies the principal features of the invention comprises a supporting frame 10 (FIGURE 1) on which a horizontally disposed product supporting and advancing conveyor 11 is mounted so as to advace successive products, for example, pork bellies to be cured for production of slabs of bacon, beneath the lower end of an upstanding frame 12 on which there is reciprocably mounted a needle carrying head 13 having a plurality of needle assemblies 14 with product engaging end portions 15 of the latter projecting from the lower end. The supporting frame 10 also carries hold-down mechanism 16 for engaging the product and holding it on the conveyor while the needle assemblies are operated to inject a brine which is supplied from a tank 17, the latter being also supported on the frame 10.

The conveyor 11 (FIGURES 1 to 4) comprises laterally spaced chains 20 and 20′ with longitudinally spaced connecting cross bar members 21 connected at opposite ends thereof to the chain links by angle brackets 22. The cross bars 21 are of outwardly opening U-shaped cross section with parallel side sections 23 and 23′ which are in inclined planes relative to the connecting web section 24 which, in the top run of the conveyor, is held or guided so that it travels in a generally horizontal plane by supporting the chains 20 and 20′ with the link connecting rollers 25 riding on longitudinally extending bars 26 and 26′, the latter being mounted on longitudinally spaced supporting cross bars 27 extending between the upstanding walls 28, 28′ forming the sides of an upwardly opening trough or tank-like structure 30 which constitutes a compartment or housing for the conveyor 11 extending longitudinally within the frame 10. Pairs of sprockets 31 and 32 at opposite ends of the compartment 30 support the chains 20 and 20′. The sprockets 31 and 32 are mounted on cross shafts 33 and 34 which are journaled in laterally spaced frame members with the leading shaft 34 having a drive sprocket 35 which is connected by a drive chain 36 with sprocket 37 on an output shaft 38 extending from a standard roller indexing drive unit 40 mounted in the lower part of the frame 10. The indexing drive unit 40 which imparts intermittent movement to the conveyor 11 is operated through the connecting miter box 41 which has an input shaft 42 carrying a drive sprocket 43 connected by a drive chain 44 with the sprocket 45 on the output shaft 46 of a speed control unit 47, the latter having a direct drive connection with the main motor 48 in which there is a clutch 50 with suitable manual control devices.

The product hold-down mechanism 16 (FIGURES 1, 3 and 4) which retains the product on the conveyor 11 while it advances past the injection station S comprises a series of laterally spaced hold-down plates 51 which are pivotally mounted in vertically disposed, parallel relation on a transverse pivot shaft 52 supported by generally L-shaped brackets 53 and 53′ at opposite sides of the conveyor 11, the brackets 53 and 53′ having the longer leg portions thereof extending horizontally above the top surface 54 of the table and forming side portions of the frame assembly 10. The plates 51 have their lower ends guided in parallel, vertical planes, so as to engage the lower edges with the product, by a cross bar member 55 which is provided with a series of parallel slots 56 cut in its bottom face 57 for receiving the plates 51. The brackets 53 and 53′ and the guide bar 55 are supported by horizontally disposed rbackets 58 and 58′ (FIGURES 3 and 4), the latter projecting inwardly from fixed members 60, 60′ which extend vertically above the top 54 of the frame 10 at opposite sides of the conveyor 11 and which are hereinafter described. The hold-down plates 51 are resiliently urged in the direction of the top run of the conveyor 11 by compression springs 61 each mounted on a pin 62 and having its lower end pivotally connected at 63 to a plate 51 and its upper end slidably guided in a suitable aperture 64 in a cross plate 65 constituting part of an inverted U-shaped frame 66 extending above the bracket members 58 and 58′.

The needle assemblies 14 are carried at their upper ends on the supporting plate 70 (FIGURES 1, 5 and 6) forming the bottom plate of the cross frame assembly 71 which extends between the upper ends of reciprocably mounted slide rods 72 and 72′, the latter extending upwardly in a forwardly inclined direction above the tops of the post-like bearing and guide members 60 and 60′ which are upstanding on the frame assembly 10 at opposite sides of the conveyor 11. The slide rods 72 and 72′ are pivotally connected at 73 and 73′ (FIGURES 3 and 4) to the bifurcated upper ends of pitman forming bars or rods 74 and 74′ which are connected at their lower ends to eccentrics 75 and 75′ on opposite ends of a cross shaft 76. The cross shaft 76 is journaled in depending side plates 77 and 77′ of an inverted U-shaped frame 78 which is secured in the frame 10 beneath the conveyor housing 30. The shaft 76 carries a drive sprocket 80 which is connected by the drive chain 81 with a drive sprocket 82 on the power shaft 46.

The needle assemblies 14 (FIGURES 5 to 9) each comprise a solid cylindrical upper end section or rod member 85, the lower end of which has a screw threaded connection at 86 with a hollow intermediate needle section or tube member 87. This intermediate section or portion has an outside diameter somewhat less than the exterior diameter of the upper rod section 85. A needle end section 88 is slidably mounted in the lower end of the tubular section 87. The needle end section 88 is a hollow tube of relatively small diameter with its free end plugged and pointed at 89 for penetration into the product and with its opposite end closed by plug 89′ (FIGURE 7). A plurality of cross holes 90 are provided adjacent the pointed end 89 for discharge therethrough of fluid from the chamber formed by the hollow tube 88. The tube 88 is slidably mounted in a collar 91 which is mounted in screw threaded relation on the lower end of the tube 87 and which has an axial bore in which the tube 88 slides. The interior diameter of the tube 87 is larger than the exterior diameter of the tube 88 and forms a fluid receiving chamber 92. A tapered sleeve 93 of rubber or the like on the upper end of the tube 88 forms a restraining valve to prevent backflow of air into the chamber 92 while permitting fluid to pass and enter the tube 88 through a series of cross holes 94 between the valve 93 and a piston 95 fixed on the tube 88 which has an O ring 95′ and which is spaced downstream of the valve 93. The tube 87 has a diametrical bore 96 adjacent its upper end which provides communication between the internal chamber 92 and the outside of the tube 87, and through which fluid passes in filling the tube for operation as hereinafter described. The lower end of the needle rod section 85 has a relatively short, axially extending bore 97 of relatively small diameter communicating with the upper end of the chamber 92 and connecting cross bores 98 for relieving entrapped air in the chamber 92.

The needle assemblies 14 are mounted in sliding relation in a two-part fluid supply manifold assembly 100 (FIGURES 1, 2, 5 and 6) which is supported on a cross plate 101 forming part of a cross frame 102. The cross frame 102 is mounted at its opposite ends on the forwardly inclined, upstanding guide posts 60 and 60′. The guide posts 60 and 60′ are inclined as shown so that the needle travel is in a path at an angle to the product and not normal to the path of travel of the product which is carried on the top run of the conveyor 11.

The two parts 103 and 103′ (FIGURES 5, 6 and 7) of the manifold assembly 100 are each supplied with a series of chamber forming bores 104 which are spaced transversely and longitudinally of the machine, which are identical and each of which receives a needle assembly 14. A bearing sleeve and packing assembly 105 is provided at the upper end of each bore 104 and a like bearing sleeve and packing assembly 105′ is provided at the lower end of bore 104. The upper sleeve assembly 105 is adapted to receive in fluidtight, sliding relation the upper rod section 85 of a needle assembly 14 while the lower sleeve assembly 105′ is adapted to receive in fluidtight, sliding relation the intermediate or middle needle assembly tube member 87. The internal diameter of each of the bearing sleeves 105 and 105′ is less than the internal diameter of bore 104. Each bore 104 in the manifold part of member 103 is connected by a passageway 106 with a supply conduit or chamber 107 in a manifold block 108 mounted on and extending along the outside face of the manifold member 103. The chamber 107 has a plurality of connections through the conduits indicated at 109 and 109′ (FIGURES 2 and 5) with a pump 110 (FIGURE 1) drawing brine from the supply tank 17. The passageway 106 is provided with a conventional one-way check valve or poppet valve indicated at 111. The internal diameter of each manifold bore 104 is larger than the external diameter of the uppermost needle member 85 so that brine supplied to bore 104 will surround the lower portion of needle member 85 which is within bore 104 and the upper portion of the still smaller diameter needle member 87 which is located within bore 104 and the amount of brine accommodated in bore 104 at any time will depend upon the relative diameters of bore 104, the needle members 85 and 87 and the axial position of the two needle members 85 and 87. The passageway 96 provides for brine under ordinary pressure to fill chamber 92 in tube member 87. The brine is forced into each bore 104 by operation of pump 110 which has its piston 112 pivotally connected at 113 to the upper end of pitman 114. The lower end of the pitman 114 is connected to an eccentric 115 on the output shaft 42 of the miter box 41. The pump 110 has conventional check valves indicated at 116 and 116′ (FIGURE 1) in the lines leading from the tank 17 and the conduit 109′. The bores 104 in the manifold member 103′ are connected by pasageways 106′ with a supply chamber or conduit 107′ in a manifold block 108′ mounted on the outside face of manifold member 103′.

A supplemental passageway 117 leads from check valve or poppet 111' to each bore 104 which provides for the passage of air out of the bore 104. The chamber 107' is connected by conduits to the pump 110 in the same manner as chamber 107 in manifold block 108.

Each needle assembly 14 is mounted so as to provide for rotation about the longitudinal axis of the assembly when withdrawn from the product. The uppermost end of the upper needle section 85 (FIGURES 5, 8 and 9) is reduced in diameter at 118 and threaded at its terminus to receive a nut 119. A sleeve member 120 having a portion of its length of relatively small diameter and its bottom end 121 enlarged to a greater diameter is adapted to be clamped on the end 118 of the member 85 by the nut 119 and the associated collar 119'. The supporting plate 70 has a bore 122 for receiving the sleeve 120 so that the latter is free to rotate in the bore 122. A collar 123 and a washer 124 preferably of plastic material, such as nylon, are mounted on the body of the sleeve 120 and seat in the recesses 125 and 126 at the ends of the bore 122. The enlarged lower end 121 of the sleeve 120 has a ring member 127 secured thereon with its upper edges notched out and provided with peripherally spaced recesses 128 for receiving tooth-like protuberances 130 which are peripherally spaced about the lower edge of the collar 123. A torsion spring 131 is set in a recess provided therefor between the inside wall of the ring member 127 and the body of the sleeve 120 with one end 132 (FIGURE 8) engaging the axial wall defining one side of a recess 128 in the ring member 127 and the other end 133 engaging an opposed axial wall defining one side of a recess 134 between the teeth 130 of the collar 123. The other side defining wall 135 of each recess 128 in the ring member 127 is inclined or beveled as shown for co-operation with a complementary edge wall 136 defining the other side of an edge recess 134 in the collar 123. The inclined edges 135 and 136 constitute cams which co-act as hereinafter described. The mechanism is assembled with the torsion spring 131 under both compression and torsional stress so that the complementary cam edges 135 and 136 of the ring member 127 and the collar 123 are urged into sliding engagement upon movement in the axial direction of the sleeve 120 in the guide aperture 122 with the result that when the needle assembly is initially lowered by downward movement of the plate 70 the cam forming sleeve member or collar 123 moves downward against the force of the torque spring 131 and due to the cam edges 135 and 136 rotates on the cam forming sleeve or collar member 120, the needle assembly being restrained against rotation by engagement with the product. The cam member 123 also moves upwardly in an axial direction on the sleeve member 120 as a result of the engagement of the co-operating cam forming edges 135 and 136. The position of the assembly after the initial downward movement is shown in FIGURE 9. When the needle assembly is retracted, the compression loading of spring 131 holds the cam member 123 against the support plate 70 and when the lower end 88 of the needle is free of the product the cam edges 135 and 136 co-operate to rotate the needle assembly about its axis which in effect moves the cam member 123 upwardly on the sleeve member 120. The position of the assembly when the needle is retracted is shown in FIGURE 8.

In operating the machine the product is advanced to the injection station S by operation of the conveyor 11 and held on the upper run thereof by the hold down plates 51. The needle head 13 reciprocates intermittently in timed relation to the intermittent advancing movement of the conveyor 11 so as to force the needle ends 15 into the product.

As needle support 70 retracts upwardly, the larger diameter part 85 of the needle assembly 14 is retracted out of chamber 104 and is replaced by the smaller diameter needle part 87, thereby progressively increasing the volume of chamber 104. This increased volume is filled with brine by the piston type input pump 112 which is run in timed relationship with movement of the needle support 70, so that needle support 70 and piston 112 reach their uppermost position at the same time. The total input of the piston pump 112 is slightly greater than the total output of all needles, with the overfill being forced out of needle points 89, thereby assuring complete filling of all chambers 104. When needle support 70 and piston pump 112 reach their uppermost positions all poppet valves 111 to the supply system close, thereby preventing backflow of brine. As needle support 70 descends the large diameter needle part 85 is forced into chamber 104, replacing the smaller diameter part 87 thereby decreasing the volume of chamber 104, forcing the brine contained in this chamber through holes 96, thence downwardly in chamber 92, past valve 93, through holes 94, again downwardly in the interior of needle portion 88, thence outwardly through holes 90 of needle points 89. This produces a uniform brine output directly proportional to the travel of the needle point through the product in the normal operation of the needle, that is, when the path of the needle is unobstructed, with each of the needles constituting an independent pump, completely separated from the others by poppet valves 111.

Because of the fact that bacon slabs at times contain bones and splinters of bones, which when encountered by the needles have a tendency to bend and break needles, a needle retracting feature is incorporated in the machine to take care of this abnormal situation, which arises from a failure in preparing the slabs to remove all of the bone. This is accomplished as shown in FIGURE 7, by incorporating in needle tube 87 a piston 95 equipped with an O ring 95' and a restraining valve 93, the needle part 88 being slidable in collar 91 and the piston 95 being slidable in chamber 92, so that if needle point 89 on its downward travel encounters an obstruction, which may occur due to the presence of bone, it will stop this part of the needle, retracting it into chamber 92. As the needle support 70 retracts, the brine supplied by the input pump 112 will exert a downward pressure on the head of piston 95, returning it to its original position.

It has been found that the internal pressure produced in chamber 92 and on the head of piston 95, by the brine being forced through holes 90 into the product, is enough to force the needle through the product without retracting, and little enough so that if the needle meets with an obstruction it will retract without bending or breaking. The restraining valve 93 prevents brine from spilling out of the needles during upward or filling motion.

The needles are operated in a slanted path so as to penetrate the product at an angle sufficient to avoid undesired chipping when the product is later sliced, the slicing being accomplished customarily by knives operating in a plane normal to the plane of the product. The needles are rotated by the action of the co-operating cam forming members 123 and 127 (FIGURE 9) which insures uniform wear and longer life for the needles and associated guides and seal members.

While specific materials and particular details of construction are referred to in describing the form of the invention which is illustrated, it will be understood that other materials and different structural details are contemplated within the spirit of the invention.

We claim:

1. An apparatus for injecting fluids into meat products and the like comprising a plurality of injection needles, a reciprocably mounted support for said needles, said needles having hollow liquid receiving bodies and product penetrating and liquid discharging hollow end portions extending from a face of said support, means for intermittently advancing a product to a position adjacent said support for penetration by said needle end portions upon reciprocation of said support, means for reciprocating said support so that the product is penetrated by said needles, means for supplying a quantity of said fluid to each of said needles including a supply manifold having fluid receiving bores in which the needles reciprocate, said needles each having means incorporated therein which forms a pump for forcing fluid through said needle end portions and into said product in uniform amounts and in accordance with the rate of penetration of said needle end portions into said product during normal advance of said needles.

2. An apparatus as recited in claim 1, and said needles each having telescoping portions operative to permit relative movement when an end portion strikes an obstruction in the product so as to prevent damage to the needle.

3. A needle assembly for injecting fluids into meat or the like which comprises an upper cylindrical rod member, an intermediate hollow cylindrical body member having an external diameter less than the corresponding diameter of the said rod member which is connected in axial alignment to the lower end of said rod member, a cylindrical hollow body penetrating lower end member of a size to slidingly telescope at its upper end within said body member, said lower end member having fluid ports at its free end, a check valve on the upper end of said body penetrating member and ports on the downstream side thereof providing passageways for liquid to flow from the intermediate body member into said lower end member, a manifold forming member having an elongate bore with bore sealing and needle guiding sleeves at opposite ends thereof so as to form a liquid measuring chamber surrounding portions of the needle rod and body members, respectively, said body member having a passageway at its upper end providing communicating between the measuring chamber and the interior of said body member, a conduit connecting said measuring chamber with a liquid supply line, and a check valve in said supply conduit to prevent reverse flow of liquid.

4. A needle assembly as recited in claim 3, and a piston forming member on said body penetrating end member immediately below the check valve thereon and the ports which are downstream of said check valve, which piston forming member is telescopically slidable in said intermediate body member.

5. In an apparatus for treating objects of irregular shape, a conveyor having a generally horizontal run on which the objects are supported and advanced to a work station and a mechanism for holding the objects on the conveyor at the work station comprising a plurality of plate-like members mounted in laterally spaced, generally parallel relation on a transverse pivot shaft above the work station so that the bottom edges of the members engage the topmost surface of the object, a cross bar member having spaced slots in the bottom face which form guides for said plate-like members, and spring means operative on each of said plate-like members for resiliently urging the plate-like members in the direction of the horizontal run of the conveyor.

6. An apparatus for injecting a curing fluid into a meat product comprising a conveyor having a horizontally disposed run on which the product is supported and advanced to an injection station, a supporting head mounted at said station for reciprocation in a generally vertical direction relative to said conveyor run, a plurality of needle assemblies mounted on said head and having end portions with fluid discharge apertures extending from a face of said head which confronts said conveyor run, means for reciprocating said head and for guiding the end portions of said needles into the body of said product, means for supplying a fluid material to said needle assemblies and said needle assemblies being operative to deliver the fluid into the body of said product at a predetermined rate according to the travel of said apertured end portions when the needles penetrate the product and advance in a normal unobstructed path, and said needle assemblies including mechanism for imparting axial rotation thereto.

7. An apparatus for injecting fluids into meat products and the like comprising a reciprocably mounted support, means for reciprocating said support, injection needle assemblies carried by said support, said needle assemblies having hollow liquid receiving bodies reciprocably mounted in said support with liquid discharging end portions extending from a face of said support, means for positioning a product relative to said support for penetration by said needle end portions upon reciprocation of said support, means connected to said needle bodies for supplying thereto a quantity of said fluid, said supply means including a supply manifold having fluid receiving bores, said needle assemblies being slidably mounted in said bores, forming thereby pump means operative for discharging said fluid through said needle end portions and in uniform amounts according to the rate of advance of said needle end portions into said product when said needle end portions are advanced in unobstructed paths and said liquid receiving bodies are reciprocated in said bores upon reciprocation of said support.

8. An apparatus as recited in claim 7, and the fluid supply means comprising a fluid measuring chamber in which each needle body is mounted, a conduit connecting each measuring chamber with a fluid supply and a supply pump for forcing the fluid into the measuring chamber so as to supply each measuring chamber with a predetermined quantity of the fluid.

9. An apparatus as recited in claim 7, and said needle assemblies having associated means for rotating the needle end portions about their longitudinal axes.

10. An apparatus as recited in claim 7, and the means for supplying a fluid to said needle bodies comprising a manifold having a plurality of chambers forming bores in which the needle bodies are slidably mounted, a fluid supply conduit connected to said manifold in communication with said chambers, said chambers being sealed at their opposite ends around the needle bodies and said needle bodies having connected portions of different external diameters which are operative in said chambers and means forming a passageway from each of said chambers into the hollow needle body associated therewith.

11. An apparatus as recited in claim 7, and the fluid supply means comprising a manifold having a plurality of parallel bores forming needle guiding and measuring chambers therein, said needle bodies being mounted in sliding relation in bore sealing and bearing sleeves at each end of the respective bores, the internal diameter of the bores being larger than the external diameter of the needle bodies, and fluid conduits connecting a fluid supply to said bores.

12. An apparatus as recited in claim 11, and check valves in said conduits to prevent return of fluid to the supply upon movement of the needle bodies in the manifold bores.

References Cited

UNITED STATES PATENTS

| | | | |
|---|---|---|---|
| 2,560,060 | 7/1951 | Zwosta | 99—256 |
| 2,641,990 | 7/1953 | Allbright et al. | 99—257 |
| 2,645,172 | 7/1953 | Allbright et al. | 99—257 |
| 2,674,179 | 4/1954 | Harrington | 99—257 |
| 2,699,717 | 1/1955 | Moreland et al. | 99—257 |
| 2,741,974 | 4/1956 | Avery | 99—257 |
| 2,756,666 | 7/1956 | Zaenkert | 99—257 |
| 2,796,017 | 7/1957 | Schmidt | 99—256 |
| 2,984,170 | 5/1961 | Draudt et al. | 99—257 |
| 3,081,691 | 3/1963 | Schmidt | 99—257 |
| 3,082,681 | 3/1963 | Petersen | 99—257 |

WALTER A. SCHEEL, *Primary Examiner.*

JOHN M. NEARY, *Assistant Examiner.*